United States Patent
Furukawa et al.

(10) Patent No.: US 8,477,398 B2
(45) Date of Patent: Jul. 2, 2013

(54) OPTICAL REFLECTION ELEMENT

(75) Inventors: Shigeo Furukawa, Osaka (JP); Kiyomi Furukawa, legal representative, Osaka (JP); Jirou Terada, Osaka (JP); Shinsuke Nakazono, Osaka (JP); Soichiro Hiraoka, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/264,530

(22) PCT Filed: May 10, 2010

(86) PCT No.: PCT/JP2010/003153
§ 371 (c)(1),
(2), (4) Date: Oct. 14, 2011

(87) PCT Pub. No.: WO2010/131449
PCT Pub. Date: Nov. 18, 2010

(65) Prior Publication Data
US 2012/0033279 A1 Feb. 9, 2012

(30) Foreign Application Priority Data

May 11, 2009 (JP) ................................. 2009-114299

(51) Int. Cl.
*G02B 26/08* (2006.01)
(52) U.S. Cl.
USPC ...................................................... 359/199.1
(58) Field of Classification Search
USPC  359/199.1–199.4, 214.1, 215.1, 223.1–226.1
See application file for complete search history.

(56) References Cited

U.S. PATENT DOCUMENTS

| 7,005,781 B2 * | 2/2006 | Smits ........................... 310/331 |
| 2003/0168942 A1 | 9/2003 | Iino et al. |
| 2006/0125347 A1 | 6/2006 | Yoda et al. |
| 2010/0296147 A1 * | 11/2010 | Terada et al. .............. 359/224.1 |

FOREIGN PATENT DOCUMENTS

| CN | 1790181 | 6/2006 |
| JP | 05-297307 | 11/1993 |
| JP | 2003-209981 | 7/2003 |
| JP | 2007-240728 | 9/2007 |
| JP | 2008-040240 | 2/2008 |
| JP | 2009-042357 | 2/2009 |
| JP | 2009-093120 | 4/2009 |
| JP | 2009-098253 | 5/2009 |

OTHER PUBLICATIONS

International Search Report of PCT Application No. PCT/JP2010/003153, dated Jun. 1, 2010.

* cited by examiner

*Primary Examiner* — Euncha Cherry
(74) *Attorney, Agent, or Firm* — Panasonic Patent Center

(57) ABSTRACT

An optical reflection element has a frame-shaped supporting body, a first oscillator and a second oscillator each having a meander shape, and a mirror portion. A line segment connecting a joining position between the mirror portion and the first oscillator to a joining position between the supporting body and the first oscillator, and a line segment connecting a joining position of the mirror portion and the second oscillator to a joining position of the supporting body and the second oscillator cross a mirror portion central axis. As one illustrative condition to be satisfied, an outer circumference of at least any one of turn portions of the first oscillator and the second oscillator is deviated from a first end portion axis that is parallel to the mirror portion central axis and extends along a first side of the mirror portion.

27 Claims, 13 Drawing Sheets

OPTICAL REFLECTION ELEMENT

TECHNICAL FIELD

The present invention relates to an optical reflection element for use in an image projection apparatus such as a head-up display, a head mounted display and the like.

BACKGROUND ART

FIG. 13 is a perspective view of a conventional optical reflection element. This optical reflection element has mirror portion 1, pair of oscillators 3, and frame body 4. Oscillators 3 are joined to end portions of mirror portion 1, respectively. Frame body 4 surrounds outer circumferences of oscillators 3 and mirror portion 1. A straight line connecting each of joining positions 5 between mirror portion 1 and oscillators 3, and each of joining positions 6 between frame body 4 and oscillators 3 is parallel to mirror portion central axis S131 passing a center of mirror portion 1.

Each of oscillators 3 is made of plurality of oscillating plates 3A to 3D, 3E to 3H joined so as to turn back in a meander shape. In oscillating plates 3A to 3H, drive elements each made of a lower electrode layer, a piezoelectric body layer, and an upper electrode layer are arranged, respectively. Applying a voltage to these drive elements allows oscillators 3 to be driven and mirror portion 1 to perform turning (pivoting) movement.

Mirror portion 1 can scan the reflected light on a screen when light enters mirror portion 1 and mirror portion 1 turns.

Furthermore, by providing a pair of oscillators that are perpendicular to oscillators 3 and are opposed to each other via frame body 4, mirror portion 1 can be excited vertically and horizontally by the oscillation of these four oscillators. With this constitution, an image can be projected on a wall, a screen or the like.

Each of these oscillators has further a monitor element made of a lower electrode layer, a piezoelectric body layer, and an upper electrode layer. When an electric signal detected by each of these monitor elements is inputted to an upper electrode of the drive element through a feedback circuit, in theory, the optical reflection element can be constantly driven at a resonant frequency. In the above-described self-exited driving method, a large amplitude can be maintained. The above-described optical reflection element is disclosed, for example, in Patent Literature 1.

In recent years, in the optical reflection element, efficient realization of a larger mirror amplitude angle is sought. This is to perform large screen projection, using the optical reflection element. For this, it is indispensable that the amplitude angle of the mirror is large. On the other hand, a drive frequency needs to be made higher in order to increase a resolution. However, the amplitude angle is reduced in high-frequency oscillation, which is disadvantage for the large screen projection. That is, increasing the resolution makes the large screen projection difficult.

CITATION LIST

Patent Literature

Patent literature 1: Unexamined Japanese Patent Publication No. 2008-040240

SUMMARY OF THE INVENTION

The present invention provides an optical reflection element that increases energy transfer efficiency by oscillators and realizes a larger mirror amplitude angle.

An optical reflection element of the present invention has a frame-shaped supporting body, a first oscillator and a second oscillator, and a mirror portion. Respective first ends of the first and second oscillators are each joined to an inside of the supporting body. The mirror portion has a rectangular shape with a first side, a second side parallel to the first side, a third side perpendicular to the first side, and a fourth side parallel to the third side. The mirror portion is joined to a second end of the first oscillator at an end portion between the first side and the third side, and is joined to a second end of the second oscillator at an end portion between the first side and the fourth side so that the mirror portion is disposed between the first and second oscillators. The mirror portion has a reflection surface surrounded by the first side, the second side, the third side and the fourth side. The mirror portion has a mirror portion central axis passing through a center of the mirror portion along a direction where the first and second oscillators, and the mirror portion are arranged side by side. Each of the first and second oscillators has a drive portion that oscillates the mirror portion, and has a meander shape in which three or more oscillating plates are joined so as to turn back at two or more turn portions. The turn portions are parallel to the mirror portion central axis. A line segment connecting a joining position between the mirror portion and the first oscillator to a joining position between the supporting body and the first oscillator crosses the mirror portion central axis, and a line segment connecting a joining position between the mirror portion and the second oscillator to a joining position between the supporting body and the second oscillator crosses the mirror portion central axis. At least a part of at least any one of the turn portions is located outside a first end portion axis that is parallel to the mirror portion central axis, and passes the first side of the mirror portion, or a whole of at least any one of the turn portions is located inside the first end portion axis. Alternatively, at least a part of at least any one of the turn portions of the oscillators is located outside a second end portion axis that is parallel to the mirror portion central axis, and passes the second side of the mirror portion, or a whole of at least any one of the turn portions of the oscillators is located inside the second end portion axis. At least any one of these conditions is satisfied. This constitution allows a highly-efficient optical reflection element with an increased amplitude angle of the mirror to be realized.

DETAILED DESCRIPTION OF PREFERRED EMBODIMENTS

First Exemplary Embodiment

Figure 1:
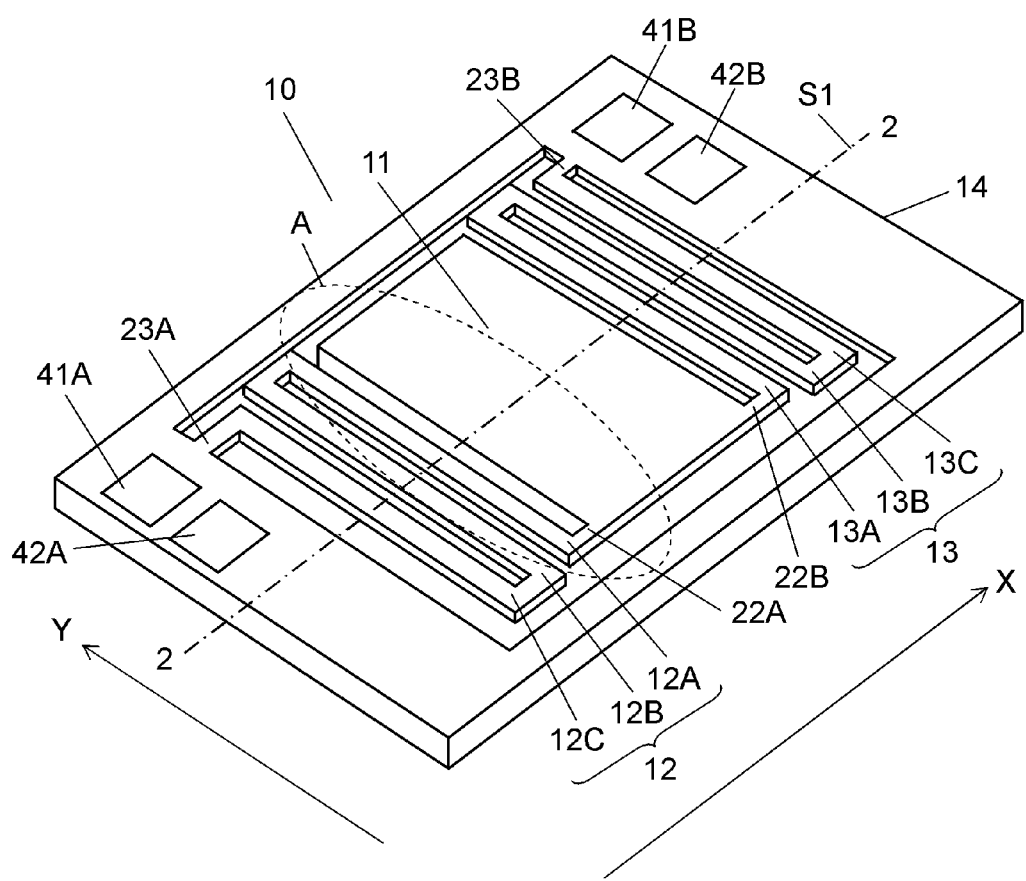
FIG. 1 is a perspective view of an optical reflection element according to a first exemplary embodiment of the present invention.
Figure 2:
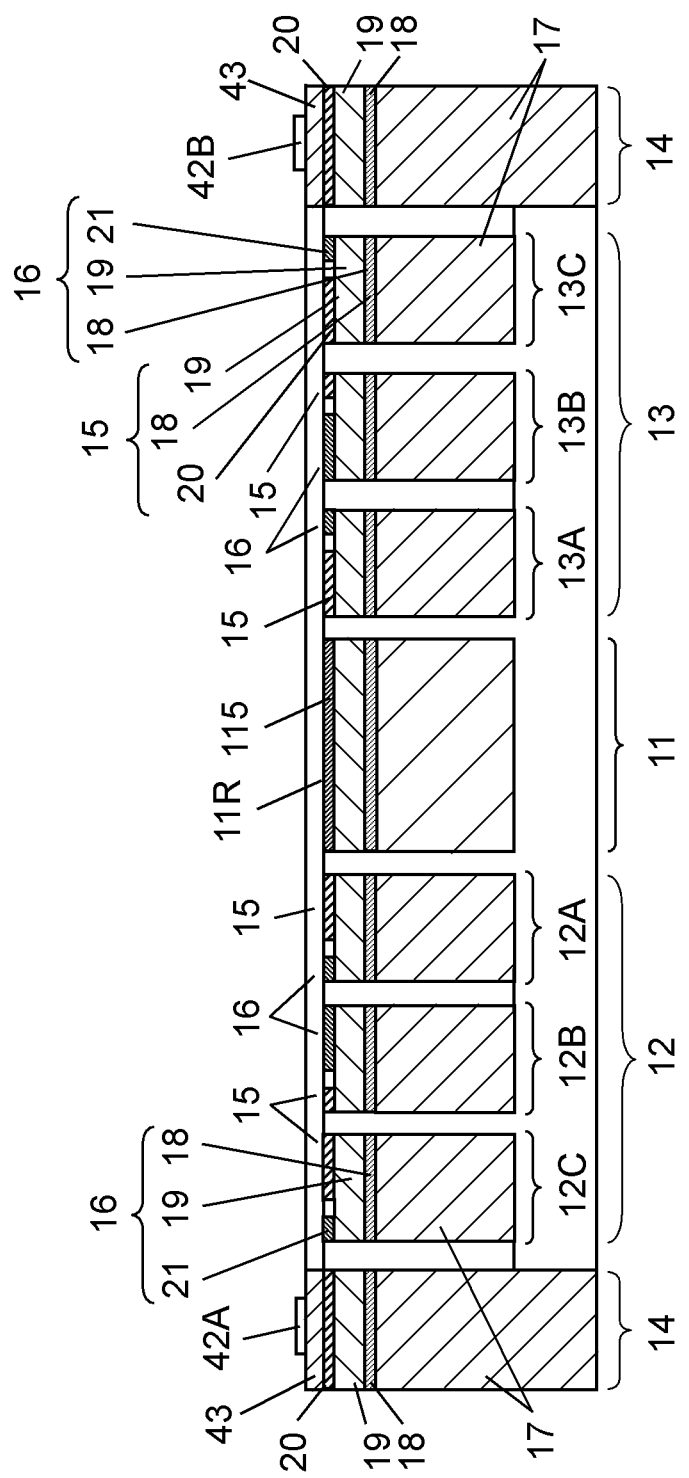
FIG. 2 is a cross-sectional view of the optical reflection element shown in FIG. 1.
Figure 3:
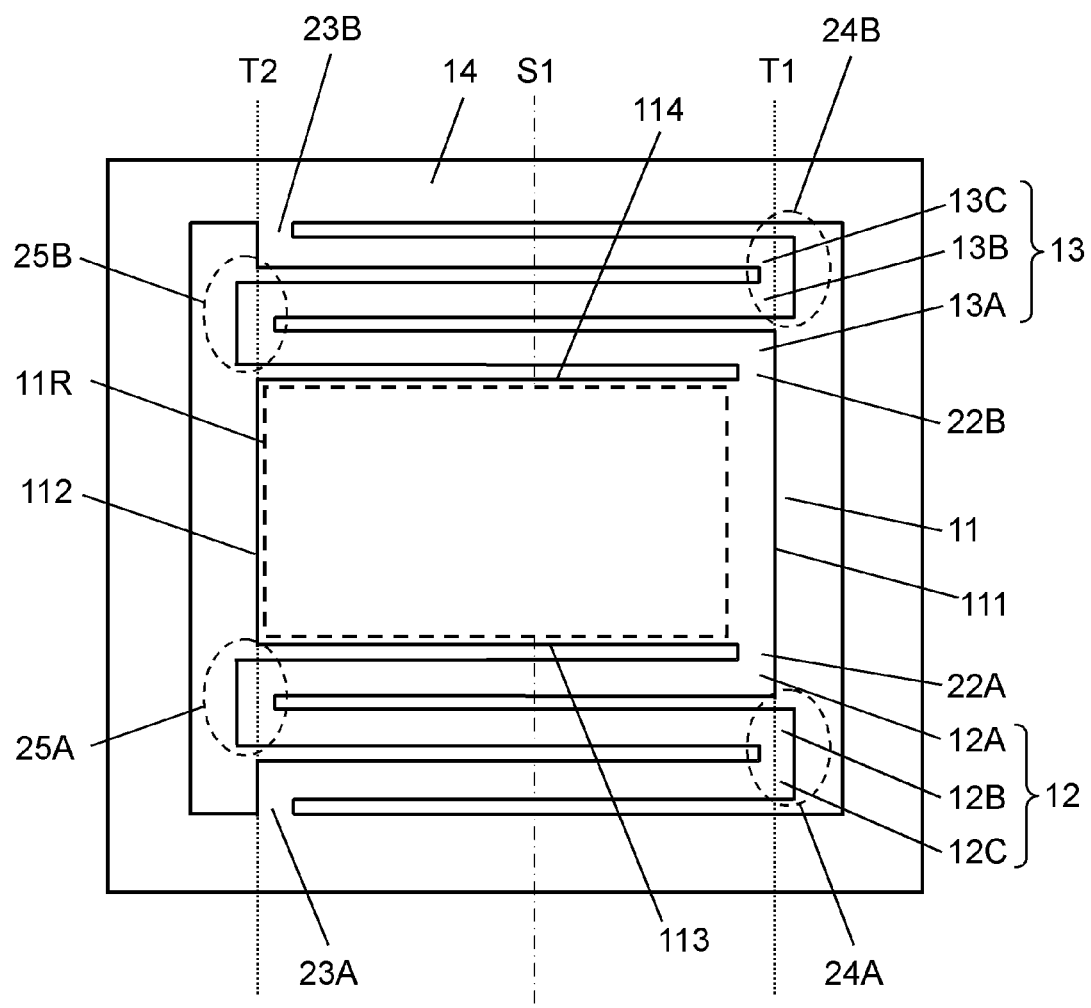
FIG. 3 is a top view of the optical reflection element shown in FIG. 1.
Figure 4:
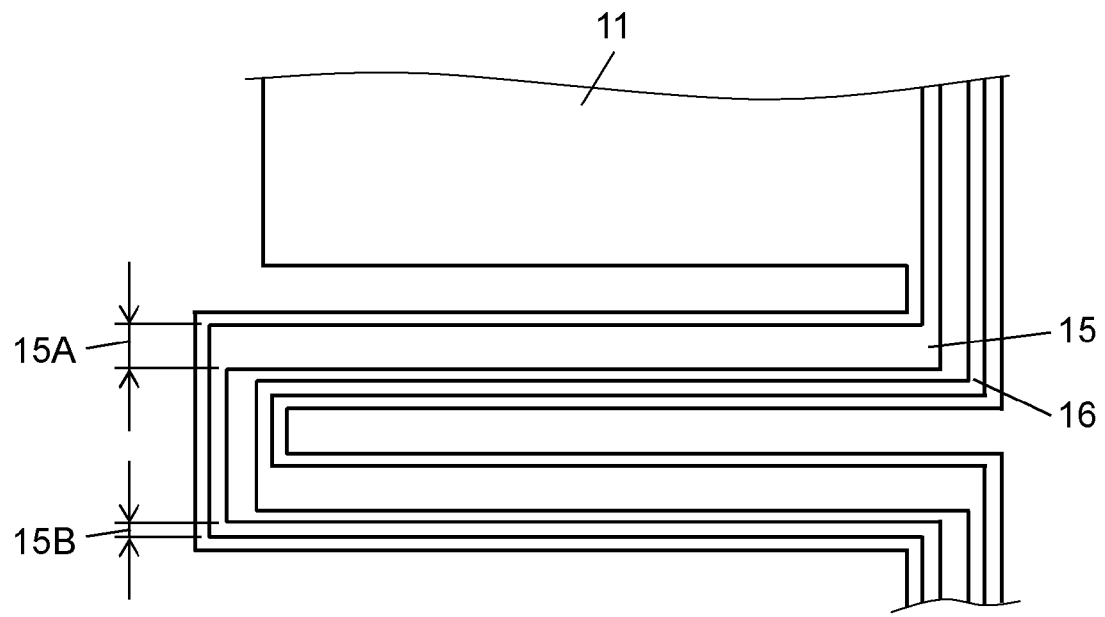
FIG. 4 is an enlarged top view of a substantial portion of the optical reflection element shown in FIG. 1.

Hereinafter, an optical reflection element according to a first exemplary embodiment of the present invention will be described with reference to FIGS. 1 to 5. FIG. 1 is a perspective view of an optical reflection element according to the first exemplary embodiment of the present invention, FIG. 2 is a cross-sectional view along line 2-2 of the optical reflection element shown in FIG. 1. FIG. 3 is a top view of the optical reflection element shown in FIG. 1, in which terminals are omitted, and FIG. 4 is an enlarged top view of a substantial portion of the optical reflection element shown in FIG. 1. As shown in FIGS. 1 to 3, optical reflection element 10 in the present embodiment has frame-shaped supporting body 14, oscillator 12, which is a first oscillator, and oscillator 13, which is a second oscillator, and mirror portion 11.

First ends of oscillators 12, 13 are joined to an inside of supporting body 14 at joining positions 23A, 23B, respectively. As shown in FIG. 3, mirror portion 11 has a rectangular shape having first side 111, second side 112 parallel to first side 111, third side 113 perpendicular to first side 111, and fourth side 114 parallel to third side 113. Mirror portion 11 is joined to a second end of oscillator 12 at an end portion between first side 111 and third side 113. That is, mirror portion 11 is joined to oscillator 12 at joining position 22A. Moreover, mirror portion 11 is joined to a second end of oscillator 13 at an end portion between first side 111 and fourth side 114. That is, mirror portion 11 is joined to oscillator 13 at joining position 22B. In this manner, mirror portion 11 is disposed between oscillators 12, 13.

As shown in FIGS. 2, 3, mirror portion 11 has reflection surface 11R surrounded by first side 111, second side 112, third side 113 and fourth side 114. Moreover, as shown in FIGS. 1, 3, mirror portion 11 has mirror portion central axis S1 (line 2-2 passing through a center of mirror portion 11 along a direction where oscillators 12, 13 and mirror portion 11 are arranged side by side.

As shown in FIGS. 1, 3, each of oscillators 12, 13 has a meander shape, in which three or more oscillating plates are joined so as to turn back at two or more turn portions. FIGS. 1, 3 show an example in which oscillator 12 has oscillating plates 12A to 12C and turn portions 24A, 25A, and oscillator 13 has oscillating plates 13A to 13C and turn portions 24B, 25B. Turn portions 24A to 25B are parallel to mirror portion central axis S1. That is, oscillator 12 is made of oscillating plates 12A to 12C joined so as to turn back at 180 degrees via turn portions 24A, 25A. Oscillating plates 12A to 12C are perpendicular to, and lie in the same plane with mirror portion central axis S1. Similarly, oscillator 13 is made of oscillating plates 13A to 13C joined so as to turn back at 180 degrees via turn portions 24B, 25B. Oscillating plates 13A to 13C are perpendicular to, and lie in the same plane with mirror portion central axis S1.

As shown in FIG. 2, each of oscillating plates 12A to 12C, 13A to 13C making up oscillators 12, 13 has drive element 15, which is a drive portion that applies a drive signal to oscillate mirror portion 11, and monitor element 16 for detecting the oscillation of oscillators 12, 13. Drive element 15 has base layer 17, lower electrode layer 18 formed on base layer 17, piezoelectric body layer 19 layered on lower electrode layer 18, and drive electrode 20, which is an upper electrode layer layered on piezoelectric body layer 19. Similarly, monitor element 16 has base layer 17, lower electrode layer 18, piezoelectric body layer 19, and monitor electrode 21, which is an upper electrode layer layered on piezoelectric body layer 19.

As shown in FIG. 1, terminals 41A, 42A are formed on a oscillator 12 side on supporting body 14, and terminals 41B, 42B are formed on a oscillator 13 side on supporting body 14. As shown in FIG. 2, these terminals are formed on insulating films 43 provided on drive electrodes 20. Terminals 41A, 41B are connected to monitor electrodes 21 via surfaces of joining positions 23A, 23B, respectively. Terminals 42A, 42B are connected to drive electrodes 20 formed under the insulating films 43 via through-hole electrodes (not shown) formed in insulating films 43, respectively.

As is clear from FIG. 3, the respective joining positions are arranged so that a line segment connecting joining position 22A to joining position 23A, and a line segment connecting joining position 22B to joining position 23B cross mirror portion central axis S1. At least a part of each of turn portions 24A, 24B is located outside first end portion axis T1, which is parallel to mirror portion central axis S1 and passes through first side 111 of mirror portion 11. Moreover, at least a part of each of turn portions 25A, 25B is located outside second end portion axis T2, which is parallel to mirror portion central axis S1 and passes through second side 112 of mirror portion 11.

Next, composition of members making up optical reflection element 10 will be described. Base layer 17 is made of a silicon wafer, a metal, glass, ceramic substrate, or a material such as resin. Metal, crystal, glass, quartz, ceramic material, resin or the like is preferable in view of availability. Furthermore, selecting a material having optimal properties for realizing an element size, an oscillation frequency, a mechanical strength as targets facilitates element structure design.

When a conductive material such as silicon is used for base layer 17, an insulating layer is formed between base layer 17 and lower electrode layer 18 to electrically insulate the conductive material making base layer 17 and lower electrode layer 18. For the insulating layer, it is preferable to use silicon dioxide.

Piezoelectric body layer 19 is made of a piezoelectric body material. Particularly, a piezoelectric body material having a high piezoelectric constant such as lead zirconate titanate (PZT) is preferable.

Lower electrode layer 18, drive electrode 20, monitor electrode 21 are manufactured by a thin film formation method such as metal vapor deposition, sol-gel, CVD, and sputtering methods. It is preferable to form lower electrode layer 18 of platinum because crystallinity of piezoelectric body layer 19 can be improved. Drive electrode 20 and monitor electrode 21 are formed of, for example, gold, titanium/gold or the like. In the latter case, a titanium film under a gold film is formed to increase a cohesion force to piezoelectric body layer 19 of the PZT thin film or the like, and besides titanium, metal such as chrome can be used. This can make favorable the cohesion between drive electrode 20 and monitor electrode 21 with piezoelectric body layer 19. Since the film of titanium, chrome or the like, and the film of gold form a robust diffusion layer, oscillators 12, 13 each having a high cohesion strength can be formed.

Reflection surface 11R, which is a top surface of mirror portion 11, can be formed by mirror-polishing a surface of piezoelectric body layer 19. However, as shown in FIG. 2, metal thin film 115 excellent in light reflection characteristics, such as gold and aluminum, may be formed. Moreover, a protective film may be formed on metal thin film 115. While lower electrode layer 18 and piezoelectric body layer 19 are provided on base layer 17 in mirror portion 11 as well in FIG. 2, mirror portion 11 may be formed of only base layer 17. In this case as well, while reflection surface 11R can be formed by mirror-polishing a surface of the base layer, metal thin film 115 may be formed thereon.

Next, operation of the optical reflection element in the first exemplary embodiment of the present invention will be described. As shown in FIG. 2, drive elements 15 are formed on oscillating plates 12A to 12C, 13A to 13C of oscillators 12, 13. Here, lower electrode layers 18 of oscillators 12, 13 are in a grounded state. Electric signals (alternating current voltage) that drive oscillators 12, 13 are inputted to drive electrodes 20 from terminals 42A, 42B.

At this time, the electric signals having oscillation frequencies specific to oscillators 12, 13 are inputted to drive electrodes 20 to resonantly drive oscillators 12, 13. Since this allows oscillators 12, 13 to be constantly driven at a resonant frequency, oscillators 12, 13 can be driven efficiently, displacement can be increased, and the deflection angle can be made large. These electric signals are synthesized through impedance elements such as resistors and are supplied to terminals 42A, 42B, respectively. As each of the impedance elements, besides the resistor, a reactance element such as a capacitor and a coil, or combination of the impedance element and the reactance element may be employed.

Monitor electrodes 21 disposed on oscillators 12, 13 sense displacement of oscillators 12, 13 as electric signals. The electric signals are derived to terminals 41A, 41B. The derived electric signals are taken out through filters (not shown), and are again inputted to drive electrodes 20 via amplifiers (not shown).

The electric signals outputted from monitor electrodes 21 are fed back to drive electrodes 20, thereby optical reflection element 10 can be self-exited to be driven.

As shown in FIG. 4, a width of drive elements 15 of even-numbered ones among oscillating plates 12A to 12C, 13A to 13C is different from odd-numbered ones. That is, adjacent drive element widths 15A, 15B differ. For this, when the alternating voltage (electric signals) at the resonant frequency of oscillators 12, 13 is applied to drive electrodes 20, in oscillating plates 12A, 12C, 13A, 13C formed with wider drive elements 15, flexural oscillation occurs in a thickness direction. In oscillating plates 12B, 13B adjacent to oscillating plates 12A, 12C, 13A, 13C, flexural oscillation in a reverse direction occurs in accordance with a principle of resonance. Moreover, on oscillating plates 12B, 13B formed so as to make the width of drive elements 15 narrower, the voltage is substantially hardly applied. Thus, oscillating plates 12B, 13B are displaced in reverse phase to that of oscillating plates 12A, 12C, 13A, 13C. Accordingly, oscillating plates 12A to 12C, 13A to 13C oscillate in alternately reverse phase, and displacement is accumulated around an oscillation axis not shown, which enables mirror portion 11 to be oscillated so as to largely repeatedly rotate and oscillate around this oscillation axis.

This constitution enables mirror portion 11 to be turned (pivoted) with a center thereof serving as a fixed point. Thus, irradiating light to mirror portion 11 allows the light to be scanned in one direction.

Next, a constitution and effects in the present embodiment will be described. Mirror portion 11 is supported by supporting body 14 through oscillators 12, 13 joined so as to be opposed to each other with mirror portion 11 interposed. In this manner, mirror portion 11 is fixed at both ends thereof. In the case where mirror portion 11 is joined only to oscillator 12, mirror portion 11 oscillates horizontally in an in-plane direction of optical reflection element 10 in addition to the turning movement. Such unnecessary oscillation would be added. However, since mirror portion 11 is fixed at both the ends, the above-described unnecessary oscillation can be suppressed.

Moreover, in optical oscillation element 10, joining position 22A of mirror portion 11 and oscillator 12 is arranged at a point where third side 113 and first end portion axis T1 cross. Joining position 22B of mirror portion 11 and oscillator 13 is arranged at a point where fourth side 114 and first end portion axis T1 cross. Therefore, as compared with a case where the joining position is arranged at a point where third side 113 or fourth side 114 crosses mirror portion central axis S1, mirror portion 11 can be oscillated with a smaller drive force. This is because mirror portion 11 can be turned, centering on first side 111 with a distance from first side 111 to second side 112 used as a radius. In this manner, highly-efficient driving is enabled.

As described above, mirror portion 11 oscillates around the oscillation axis. If the oscillation axis is closer to mirror portion central axis S1, a mass balance of optical reflection element 10 is brought, so that energy transfer efficiency by oscillators 12, 13 can be increased. That is, the energy transfer efficiency depends on a position of the oscillation axis with respect to mirror portion central axis S1, and when mirror portion central axis S1 and the oscillation axis match each other, the energy transfer efficiency becomes maximal. As a result, an amplitude degree can be stably increased with a constant drive force, and in optical reflection element 10, a larger mirror amplitude angle can be realized.

Considering an inertia moment of mirror portion 11 when mirror portion 11 performs the turning movement, a value thereof becomes minimal when the oscillation axis matches mirror portion central axis S1, and the value increases as the oscillation axis deviates from the center of mirror portion 11 more. Since the larger the value of the inertia moment becomes, the larger drive force is required, it is preferable for large displacement driving that the oscillation axis matches mirror portion central axis S1.

In optical reflection element 10, the line segment connecting joining position 22A of mirror portion 11 and oscillator 12 to joining position 23A of supporting body 14 and oscillator 12 crosses mirror portion central axis S1. Moreover, the line segment connecting joining position 22B of mirror portion 11 and oscillator 13 to joining position 23B of supporting body 14 and oscillator 13 crosses mirror portion central axis S1. That is, joining position 22A is located on a side opposite a side where joining position 23A is located with respect to mirror portion central axis S1, while joining position 22B is located on a side opposite a side where joining position 23B is located with respect to mirror portion central axis S1. This constitution brings the oscillation axis closer to mirror portion central axis S1.

Moreover, it is preferably that centers of the above-described line segments connecting the joining positions are on the mirror portion central portion S1 axis. This increases symmetry of oscillators 12, 13, which can further bring the oscillation axis closer to mirror portion central axis S1. Furthermore, it is more preferable for the highly-efficient driving that mirror portion 11 and oscillators 12, 13 are connected along first end portion axis T1 passing through an end portion of mirror portion 11.

In order to bring the oscillation axis closer to mirror portion central axis S1, positions of the turn portions connecting the oscillating plates may be changed. The change of the positions of the turn portions will change centroid positions of the oscillating plates. This can bring the oscillation axis closer to mirror portion central axis S1. As a result, in optical reflection element 10, at least a part of each of turn portions 24A, 24B is located outside first end portion axis T1, while at least a part of each of turn portions 25A, 25B is located outside second end portion axis T2. In some constitutions, a whole of at least any one of the turn portions may be located inside first end portion axis T1, or a whole of at least any one of the turn portions may be located inside second end portion axis T2.

With any of these constitutions, the positions of turn portions 24A to 25B are adjusted to adjust lengths of oscillators 12, 13, which can further bring the oscillation axis closer to mirror portion central axis S1.

It is effective to change the positions of the turn portions in the turn portions near supporting body 14. A force that binds oscillators 12, 13 differs between a side near mirror portion 11 and a side near supporting body 14. On the mirror portion 11 side, oscillators 12, 13 are near free ends, and thus, the force that binds oscillators 12, 13 is weak. On the other hand, since supporting body 14 has a frame shape, the force that binds oscillators 12, 13 is strong on the supporting body 14 side. Therefore, when lengths of oscillating plates 12A to 12C, 13A to 13C making up oscillators 12, 13 are the same, nearer oscillation plates 12C, 13C is with respect to supporting body 14, further oscillation axes thereof are displaced from mirror portion central axis S1. Accordingly, changing the positions of the turn portions on the side near supporting body 14 makes it easier to adjust the oscillation axis. As shown in FIG. 3, for example, in the case where oscillators 12, 13 have only the two turn portions, it is preferable to adjust the positions of turn portions 24A, 24B.

In this manner, at least a part of at least any one of turn portions 24A, 24B is located outside first end portion axis T1, or the whole of at least any one of turn portions 24A, 24B is located inside first end portion axis T1. Alternatively, at least a part of at least any one of turn portions 25A, 25B is located outside second end portion axis T2, or the whole of at least any one of turn portions 25A, 25B is located inside second end portion axis T2. At least one of these two conditions only needs to be satisfied. In other words, at least any one of the conditions that an outer circumference of at least any one of turn portions 24A, 24B is deviated from first end portion axis T1, and that an outer circumference of at least any one of turn portions 25A, 25B is deviated from second end portion axis T2 only needs to be satisfied.

Figure 5:
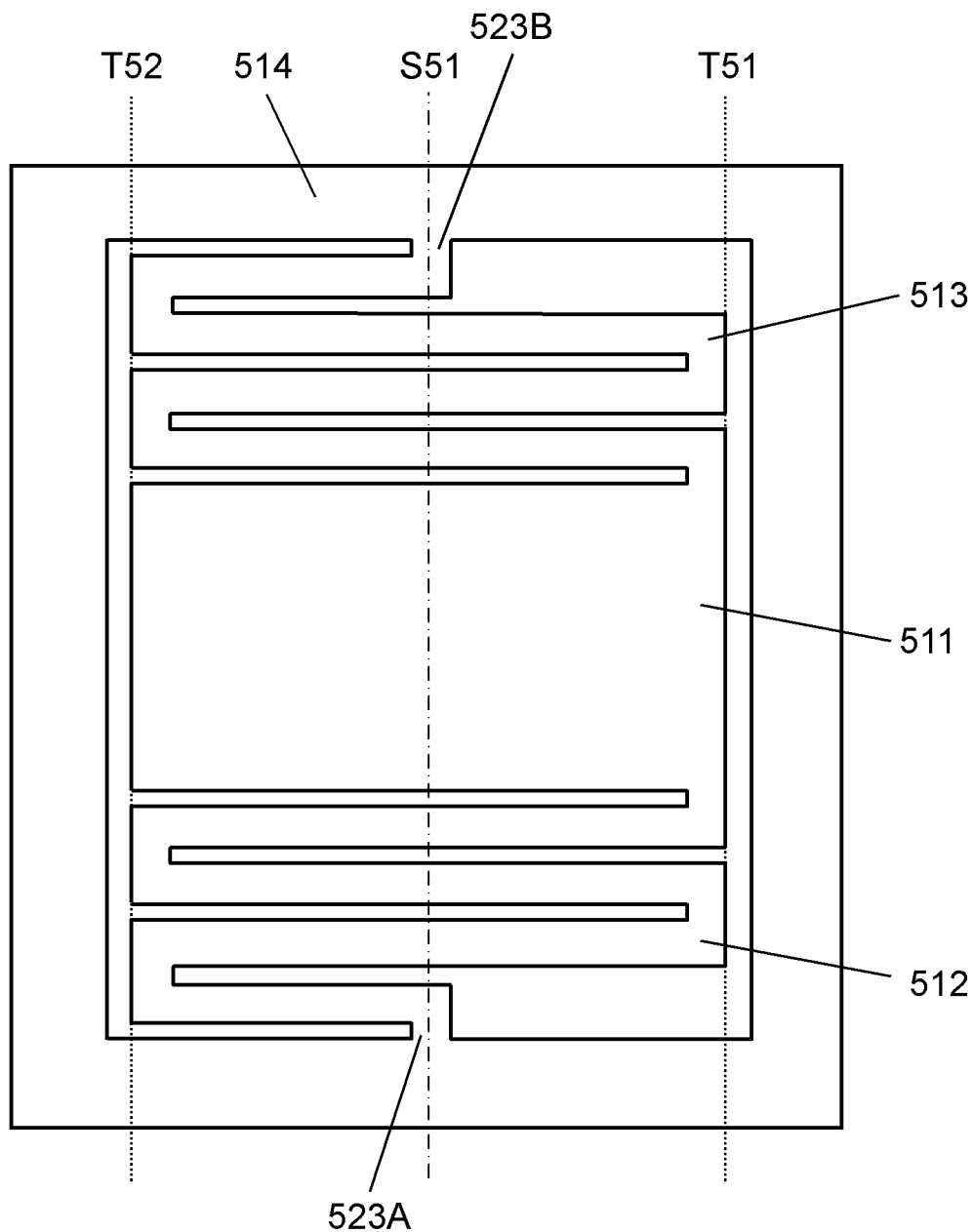
FIG. 5 is a top view of another optical reflection element to be compared with the optical reflection element shown in FIG. 1.
Figure 6:
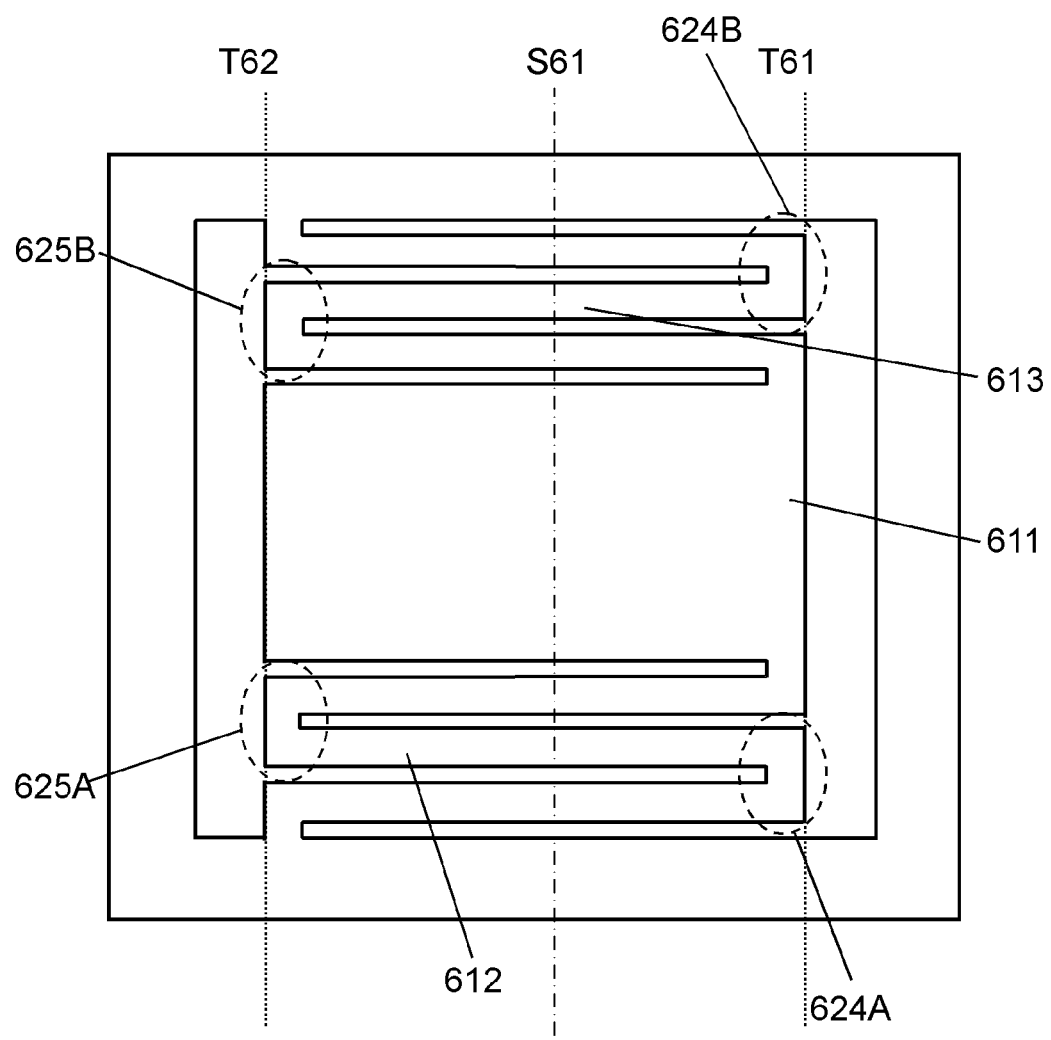
FIG. 6 is a top view of still another optical reflection element to be compared with the optical reflection element shown in FIG. 1.

Next, performance of optical reflection element 10 shown in FIGS. 1 to 4 and that of optical reflection elements having structures shown in FIGS. 5, 6 will be compared. FIGS. 5, 6 are top views of the optical reflection elements to be compared with optical reflection element 10.

In the optical reflection element shown in FIG. 5, oscillator 512 and supporting body 514 are joined at joining position 523A on mirror portion central axis S51, and oscillator 513 and supporting body 514 are joined at joining position 523B on mirror portion central axis S51. Moreover, all outer circumferences of turn portions of oscillators 512, 513 are along one of first end portion axis T51 and second end portion axis T52. Constitutions other than the foregoing are similar to those shown in FIG. 3. That is, mirror portion 511 is joined to oscillators 512, 513 at positions along first end portion axis T51.

On the other hand, in the optical reflection element shown in FIG. 6, all outer circumferences of turn portions 624A, 624B, 625A, 625B of oscillators 612, 613 are along one of first end portion axis T61 and second end portion axis T62. Constitutions other than the foregoing are similar to those shown in FIG. 3. That is, mirror portion 611 is joined to oscillators 612, 613 at positions along first end portion axis T61.

Figure 7:
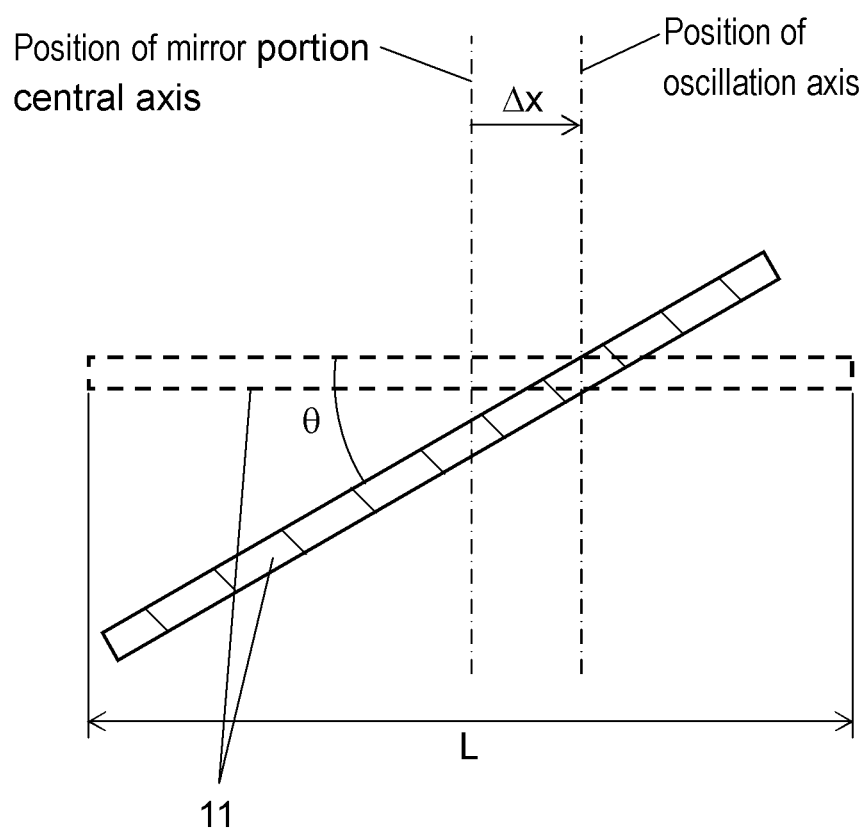
FIG. 7 is a cross-sectional view of a mirror portion of the optical reflection element shown in FIG. 1 when the optical reflection element is in operation.

These three optical reflection elements are manufactured into the shapes shown in Table 1, using silicon for base layer 17, and PZT for the piezoelectric body layer. In optical reflection element 10 shown in FIG. 3, specifically, the outer circumferences of turn portion 24A, 24B are located outside end portion axis T1 by 100 μm, and the outer circumferences of turn portions 25A, 25B are located outside end portion axis T2 by 100 μm. An oscillation axis deviation and an amplitude angle θ are measured, respectively, when a voltage obtained by superimposing an alternating voltage 0.5 V of the resonant frequency on a direct voltage 0.5 V is applied to these optical reflection elements of No. 1 to No. 3. Measurement results are also shown in Table 1. The oscillation axis deviation is evaluated in accordance with Δx/(L/2) normalized with width L of the mirror portion. Relationships of these values are shown in FIG. 7. FIG. 7 shows a cross section of the mirror portion when optical reflection element 10 shown in FIG. 1 is in operation, as one example.

TABLE 1

| | Element No. | | |
| --- | --- | --- | --- |
| | 1 | 2 | 3 |
| Structure | FIG. 5 | FIG. 6 | FIG. 3 |
| Mirror portion size (μm × μm) | 2000 × 1000 | 2000 × 1000 | 2000 × 1000 |
| Number of oscillating plates | 3.5 | 3 | 3 |
| Oscillating plate length (μm) | 2000 | 2000 | 2000 |
| Oscillating plate width (μm) | 130 | 130 | 130 |
| Oscillating plate thickness (μm) | 100 | 100 | 100 |
| Joining position between supporting body and oscillator | mirror portion central axis | First end portion axis | First end portion axis |
| Resonant frequency (Hz) | 7978 | 8345 | 7895 |
| Oscillation axis deviation Δx/(l/2) | 0.4663 | 0.1211 | −0.0492 |
| Amplitude angle θ (°) | 1.06 | 1.68 | 1.77 |

As compared the element of No. 1 having the structure shown in FIG. 5 with the element of No. 2 having the structure shown in FIG. 6, in Table 1, the element of No. 2 has a smaller amount of oscillation axis deviation. That is, the position of the oscillation axis is closer to the mirror portion central axis. Moreover, the amplitude angle is also larger. In this manner, as shown in FIG. 6, it is preferable that each of the joining positions of the mirror portion and the oscillators and each of the joining positions of the oscillators and the supporting body are located on the opposite sides to each other with respect to the mirror portion central axis. It can be verified that this constitution allows the optical reflection element driven highly efficiently to be realized.

Furthermore, as compared the element of No. 2 having the structure shown in FIG. 6 with the element of No. 1 having the structure shown in FIG. 3, in Table 1, the element of No. 3 has a smaller amount of oscillation axis deviation. That is, the position of the oscillation axis is closer to the mirror portion central axis. Moreover, the amplitude angle is also larger. In this manner, it is preferable that as shown in FIG. 3, at least a part of each of turn portions 24A, 24B is located outside first end portion axis T1, while at least a part of each of turn portions 25A, 25B is located outside second end portion axis T2. It can be verified that this constitution allows the optical reflection element driven more highly efficiently to be realized.

As described before, the whole of at least any one of turn portions 24A, 24B may be located inside first end portion axis T1, or the whole of at least any one of turn portions 25A, 25B may be located inside second end portion axis T2.

In the present embodiment, the number of oscillating plates 12A to 12C, 13A to 13C only needs to be an odd number not less than 3, and otherwise, it is not limited.

In FIG. 2, drive elements 15 are disposed on both of oscillators 12, 13 opposed to mirror portion 11. However, when the resonant driving is performed, drive element 15 may be disposed on only one of oscillators 12, 13. For example, in the case where drive element 15 is disposed only on oscillator 12, the oscillation is transmitted from oscillator 12 to oscillator 13 through mirror portion 11, thereby resonantly driving oscillator 13 similarly.

Moreover, in FIG. 2, monitor elements 16 are disposed on both of oscillators 12, 13. However, when the resonant driving is performed, drive element 15 may be disposed on only one of oscillators 12, 13. Particularly, as described above, in the case where drive element 15 is disposed only in oscillator 12, monitor element 16 may be disposed only in oscillator 13.

In the constitution shown in FIGS. 2, 4, monitor element 16 and drive element 15 are formed on one oscillating plate. Thus, in the oscillating plate with wider drive element width 15A, a width of monitor element 16 is narrower, while in the oscillating plate with narrower drive element width 15B, the width of monitor element 16 is wider. However, in the case where drive element 15 is disposed only on oscillator 12, and monitor element 16 is disposed only on oscillator 13, monitor element 16 can be formed with a larger width. Monitor element 16 senses, as an electric signal, displacement of the piezoelectric body layer of oscillator 13 where monitor element 16 is formed. This electric signal can be inputted to drive element 15 of oscillator 12 through the feedback circuit.

Thereby, even if the resonant frequency of oscillators 12, 13 fluctuates due to a design error or an external environmental factor, the desired electric signal can be applied while checking the driving, and optical reflection element 10 can be self-excited to be driven with a high accuracy.

Second Exemplary Embodiment

Figure 8:
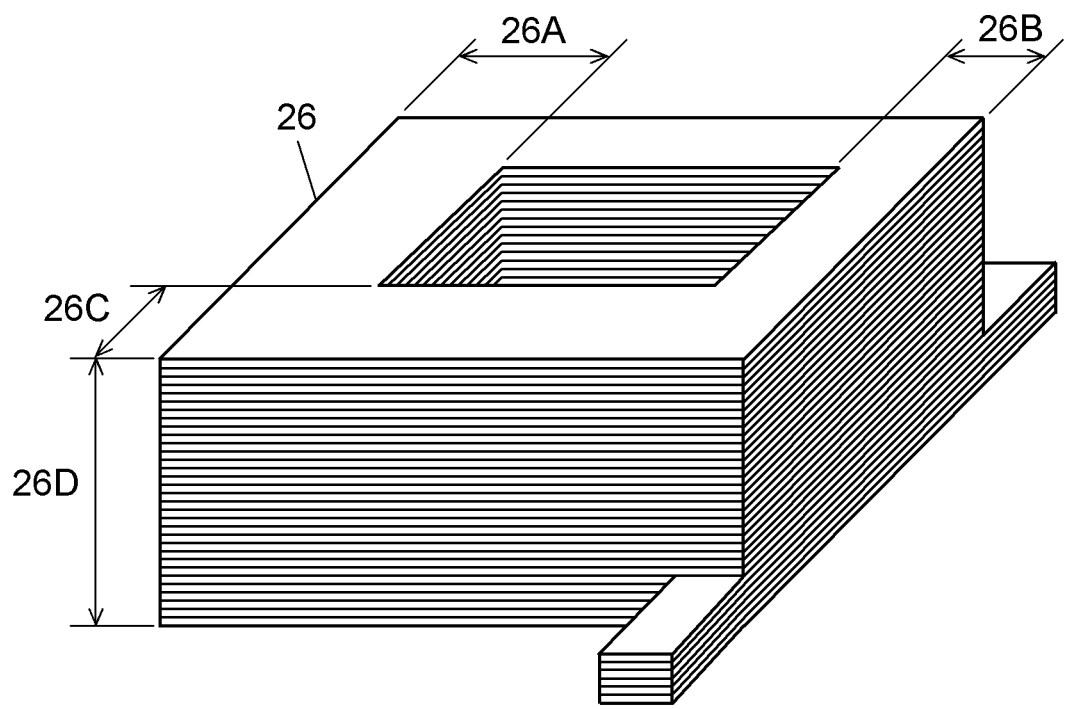
FIG. 8 is a perspective view on a side opposite a reflection surface of a mirror portion of an optical reflection element according to a second exemplary embodiment of the present invention.
Figure 9:
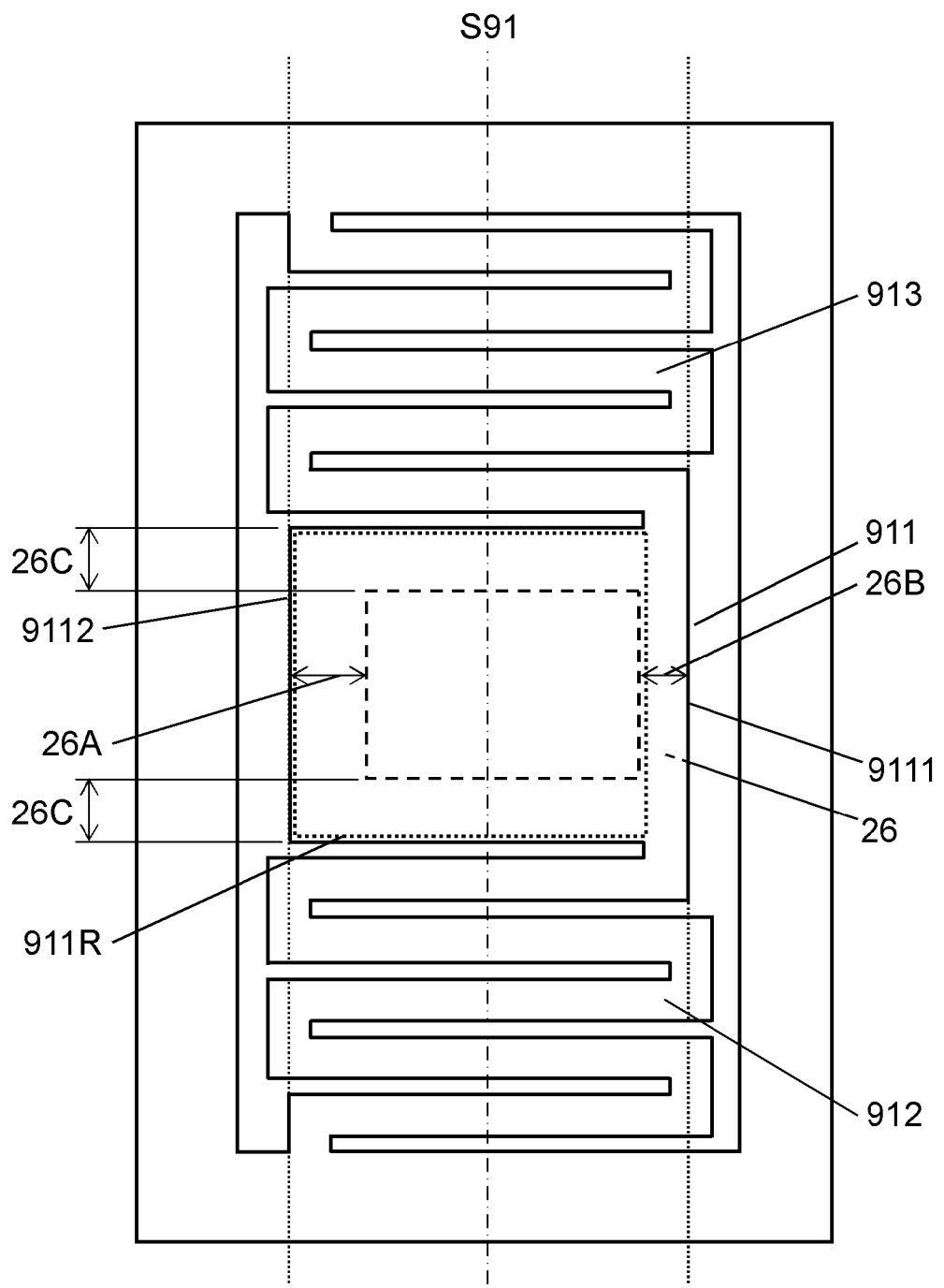
FIG. 9 is a top view of the optical reflection element according to the second exemplary embodiment of the present invention.

FIG. 8 is a perspective view on a side opposite a reflection surface of a mirror portion of an optical reflection element according to a second exemplary embodiment of the present invention. FIG. 9 is a top view of the optical reflection element according to the second exemplary embodiment of the present invention.

The present embodiment is different from the first exemplary embodiment in that frame-shaped weight 26 as shown in FIG. 8 is provided on a back side of reflection surface 911R of mirror portion 911 of the optical reflection element as shown in FIG. 9. In weight 26, frame width 26A and frame width 26B both parallel to mirror portion central axis S91 are different. That is, the frame width of weight 26 between an inside and an outside on first side 9111 is different from that on second side 9112. Each of oscillators 912, 913 is formed of five oscillating plates, which is not an essential difference. Basic constitutions other than the foregoing are similar to those in FIG. 3.

A position of an oscillation axis of mirror portion 911 is determined by a balance between a moment of displacement of oscillators 912, 913, and an inertia moment of mirror portion 911. On the other hand, by forming weight 26 in which frame width 26A and frame width 26B are different on the back side of reflection surface 911R as described above, the inertia moment of mirror portion 911 can be adjusted. As a result, the oscillation axis of mirror portion 911 can be brought closer to mirror portion central axis S91, so that the optical reflection element driven more highly efficiently can be realized. After making up the optical reflection element without weight 26, weight 26 can be added to mirror portion 911 to adjust the position of the oscillation axis.

Moreover, since the formation of weight 26 increases a mass of mirror portion 911, the frequency can be shifted to a low frequency side without increasing a size of the optical reflection element. Further, since weight 26 has a frame shape, flexural deformation of mirror portion 11 can be suppressed.

Figure 10:
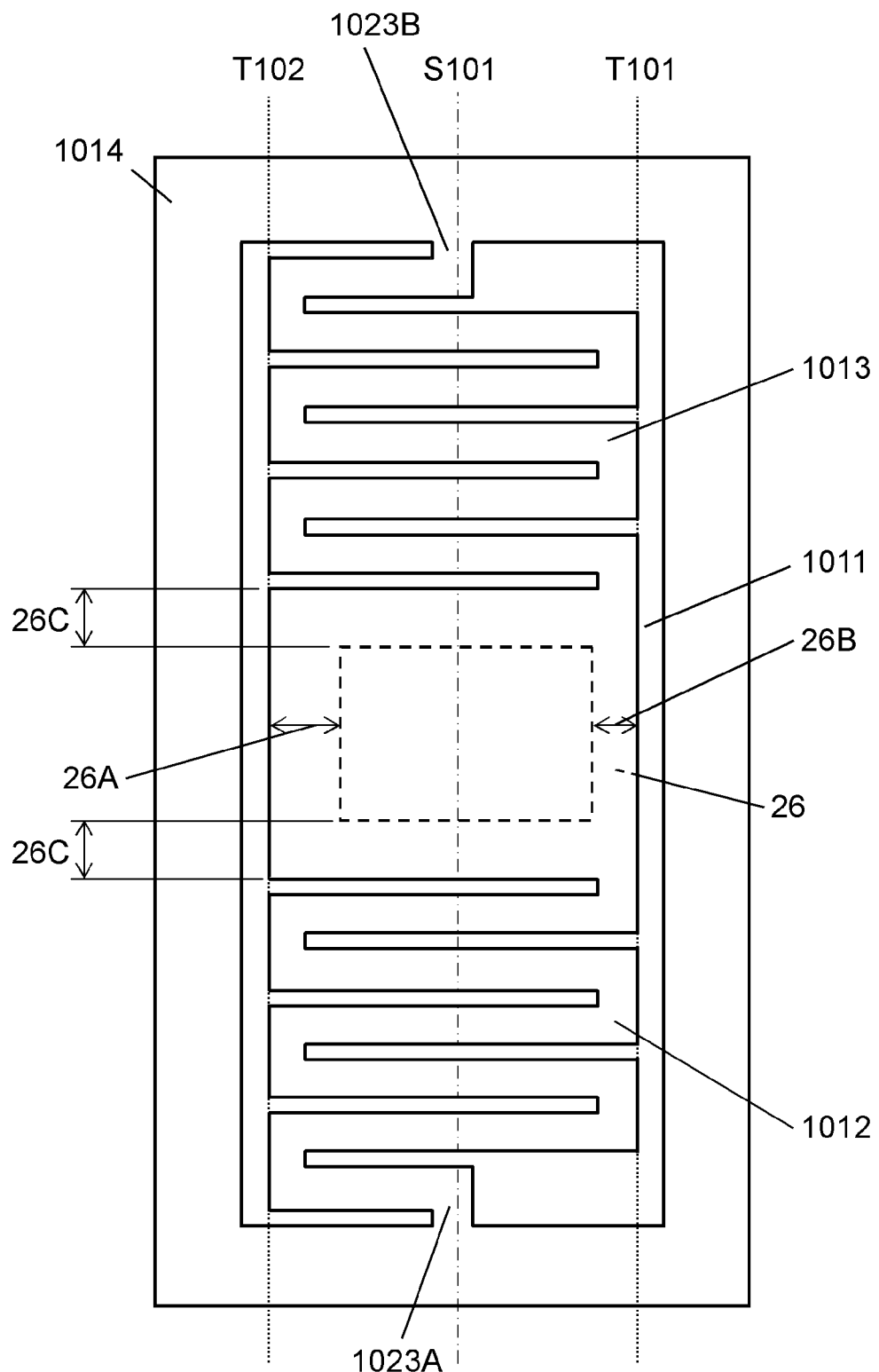
FIG. 10 is a top view of another optical reflection element according to the second exemplary embodiment of the present invention.

While in FIG. 9, weight 26 is added to the optical reflection element substantially similar to that having the constitution shown in FIG. 3, weight 26 also exerts the above-described effect whenever it is added to an optical reflection element having another constitution. That is, driving efficiency can be increased, independently of the constitution of the first exemplary embodiment In order to verify the above-described effect of weight 26, differences by the presence or absence of weight 26 are examined with respect to a constitution shown in FIG. 10. FIG. 10 is a top view of an optical reflection element according to the present embodiment for verifying the effect of weight 26. In this constitution, joining positions 1023A, 1023B of supporting body 1014 and oscillators 1012, 1013 are on mirror portion central axis S101. Moreover, outer circumferences of respective turn portions of oscillators 1012, 1013 are along end portion axes T101, T102. That is, the constitution in which the oscillation axis deviation easily becomes large unless the oscillation axis is adjusted by design are selected, and differences due to variation in symmetry of weight 26 on a back surface of mirror portion 1011 are examined.

A size of mirror portion 1011 is 1300 μm×1000 μm. A number of oscillating plates of oscillators 1012, 1013 is 5.5, a length of the respective oscillators is 1300 μm, a width is 130 μm, and a thickness is 100 μm. Thickness 26D of weight 26 is 575 μm. Frame widths 26A, 26B, 26C of weight 26 are shown in Table 2. The optical reflection elements of No. 4 and No. 5 with the above-described weights added to mirror portion 1011 are formed, and are resonantly oscillated as in the first exemplary embodiment to evaluate the oscillation axis deviation and the amplitude angle. Results are shown in Table 2.

TABLE 2

| | Element No. | |
| --- | --- | --- |
| | 4 | 5 |
| Frame width 26A (μm) | 250 | 345 |
| Frame width 26B (μm) | 250 | 155 |

TABLE 2-continued

| | Element No. | |
| --- | --- | --- |
| | 4 | 5 |
| Frame width 26C (μm) | 250 | 250 |
| Resonant frequency (Hz) | 5716 | 5871 |
| Oscillation axis deviation Δx/(l/2) | −0.5935 | −0.0441 |
| Amplitude angle θ (°) | 0.80 | 1.27 |

In the optical reflection element of No. 4, frame widths 26A, 26B, 26C of the frame-shaped weight formed on the back surface of mirror portion 911 are the same. In the optical reflection element of No. 5, frame width 26A and frame width 26B of weight 26 are changed from those of the optical reflection element of No. 4. However, a sum of frame width 26A and frame width 26B is not changed. In this manner, frame widths 26A, 26B are made asymmetry with respect to mirror portion central axis S101.

As is clear from Table 2, it is verified that in the optical reflection element of No. 5, the amount of oscillation axis deviation is reduced, and the amplitude angle is increased, as compared with the optical reflection element of No. 4.

Even though joining positions 1023A, 1023B of supporting body 1014 and oscillators 1012, 1013 are not on mirror portion central axis S101, setting frame widths 26A, 26B of weight 26 to appropriate values can bring about a similar effect. It is preferable that thickness 26D of weight 26 is the same as a thickness of supporting body 1014, because machining is easy.

The pair of frame portions parallel to mirror portion central axis S101 in weight 26 may be made asymmetry in mass by changing thickness 26D. In the above-described constitution as well, a similar effect to that when frame width 26A and frame width 26B are different can be obtained. Alternatively, in the case where frame widths 26A, 26B are the same, and the thicknesses are the same, the pair of frame portions parallel to mirror portion central axis S101 may be formed at an asymmetric distance with respect to mirror portion central axis S101. In this manner, even when the distances from mirror portion central axis S101 to the pair of frame portions are made different from each other, a similar effect to that of the above-described constitution can be obtained.

Third Exemplary Embodiment

Figure 11:
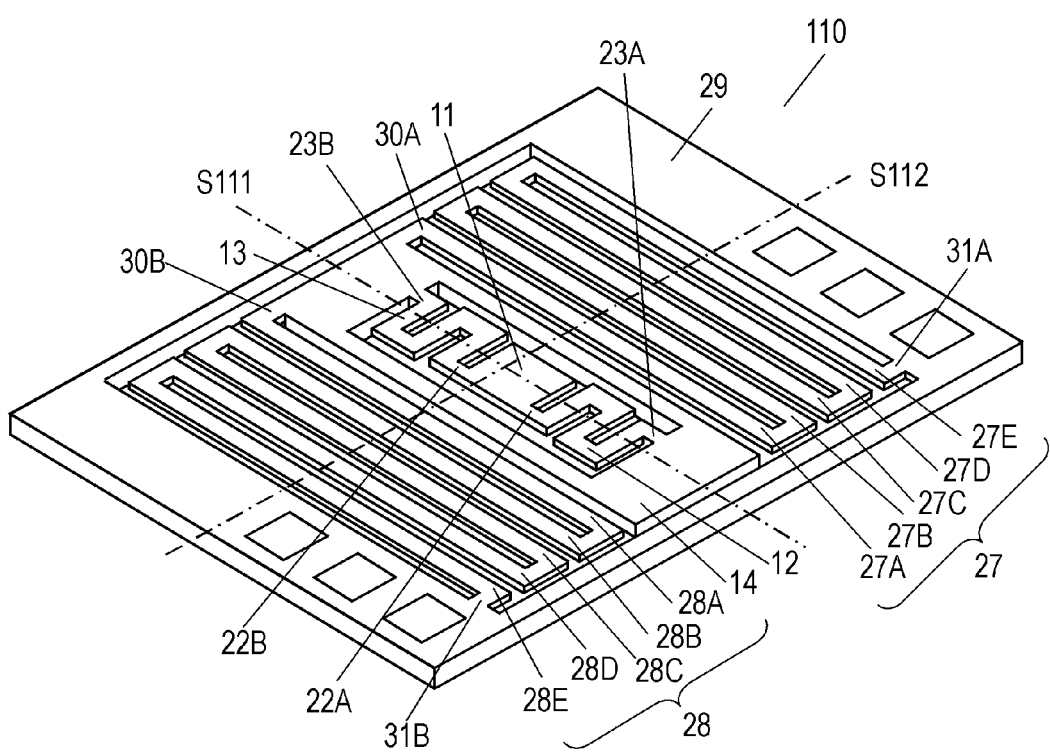
FIG. 11 is a perspective view of an optical reflection element according to a third exemplary embodiment of the present invention.

FIG. 11 is a perspective view of an optical reflection element according to a third exemplary embodiment of the present invention. Descriptions of components having similar constitutions to those in the first exemplary embodiment will be omitted, and differences will be described in detail. The present embodiment is different from the first exemplary embodiment in that the optical reflection element is biaxially driven.

As shown in FIG. 11, optical reflection element 110 has mirror portion 11, oscillators 12, 13, supporting body 14, oscillators 27, 28 and supporting body 29. Oscillator 12 as the first oscillator and oscillator 13 as the second oscillator are opposed to each other with mirror portion 11 interposed, and are joined to mirror portion 11 at the respective first ends thereof. Supporting body 14, which is a frame-shaped first supporting body, is joined to the respective second ends of oscillators 12, 13 and surrounds outer circumferences of oscillators 12, 13 and mirror portion 11. Oscillator 27 as a third oscillator and oscillator 28 as a fourth oscillator are opposed to each other with supporting body 14 interposed, and are joined to supporting body 14 at respective first ends thereof. Supporting body 29, which is a frame-shaped second supporting body, is joined to respective second ends of oscillators 27, 28 and surrounds outer circumferences of oscillators 27, 28 and supporting body 14.

In this manner, mirror portion 11, oscillators 12, 13, and supporting body 14 form a similar structure to that of optical reflection element 10 in the first exemplary embodiment. That is, oscillators 12, 13 have plurality of oscillating plates 12A to 12C, 13A to 13C, and the respective oscillating plates are joined so as to turn back at the turn portions. Joining positions 22A, 22B of mirror portion 11 and oscillators 12, 13 are located on a side opposite a side where joining positions 23A, 23B of supporting body 14 and oscillators 12, 13 are located, with respect to mirror portion central axis S111 which passes through the center of mirror portion. That is, the line segment connecting joining position 22A to joining position 23A and the line segment connecting joining position 22B to joining position 23B cross mirror portion central axis S111. Furthermore, the outer circumferences of the respective turn portions of oscillators 12, 13 are parallel to mirror portion central axis S111, and are located outside the first end portion axis and the second end portion axis along the first side and the second side of mirror portion 11, respectively. The constitutions, composition, joining positions, and the disposed positions of the upper electrode layers of oscillators 12, 13 are similar to those in the first exemplary embodiment.

Furthermore, oscillators 27, 28 have plurality of oscillating plates 27A to 27E, 28A to 28E, and the respective oscillating plates are joined so as to turn back at tuning portions. The constitution is such that joining positions 30A, 30B of supporting body 14 and oscillators 27, 28, and joining positions 31A, 31B of supporting body 29 and oscillators 27, 28 are located on the opposite sides to each other with respect to mirror portion central axis S112 that passes through the center of mirror portion 11. That is, a line segment connecting joining position 30A to joining position 31A, and a line segment connecting joining position 30B to joining position 31B cross mirror portion central axis S112. Mirror portion central axis S112 is perpendicular to mirror portion central axis S111. Accordingly, if supporting body 14 is likened to mirror portion 611, supporting body 14, oscillators 27, 28 and supporting body 29 have similar constitutions to those of the optical reflection element in FIG. 6.

The oscillation axis of oscillators 12, 13, and the oscillation axis of oscillators 27, 28 have a perpendicular relationship. This allows the light reflected from mirror portion 11 to be scanned horizontally and vertically. Moreover, the oscillation axis of oscillators 12, 13, and the oscillation axis of oscillators 27, 28 cross in the center of mirror portion 11. Accordingly, the center of mirror portion 11 is a fixed point. When the light enters this fixed portion, light path lengths of incident light and reflected light are constant, thereby enabling a high-accuracy image to be projected.

Descriptions of constitutions and effects similar to those in the first exemplary embodiment of the present invention will be omitted.

Joining position 30A and joining position 31A, and joining position 30B and joining position 31B may not be located on the opposite sides to each other with respect to mirror portion central axis S112. At least, as long as joining position 22A and joining position 23A, and joining position 22B and joining position 23B are located on the opposite sides to each other with respect to mirror portion central axis S111, and the outer circumferences of the turn portions are located outside one of the first end portion axis and the second end portion axis, a similar effect to that of the first exemplary embodiment can be obtained. However, it is preferable for highly-efficient driving that joining position 30A and joining position 31A, and joining position 30B and joining position 31B are located on the opposite sides with respect to mirror portion central axis S112. Moreover, although not shown, it is more preferable that the outer circumferences of the turn portions of the oscillators 27, 28 are parallel to mirror portion central axis S112, and are located outside a first end portion axis and a second end portion axis along two parallel sides not connected to oscillators 27, 28, of supporting portion 14. This enables mirror portion 11 to be driven more highly efficiently.

Fourth Exemplary Embodiment

Figure 12:
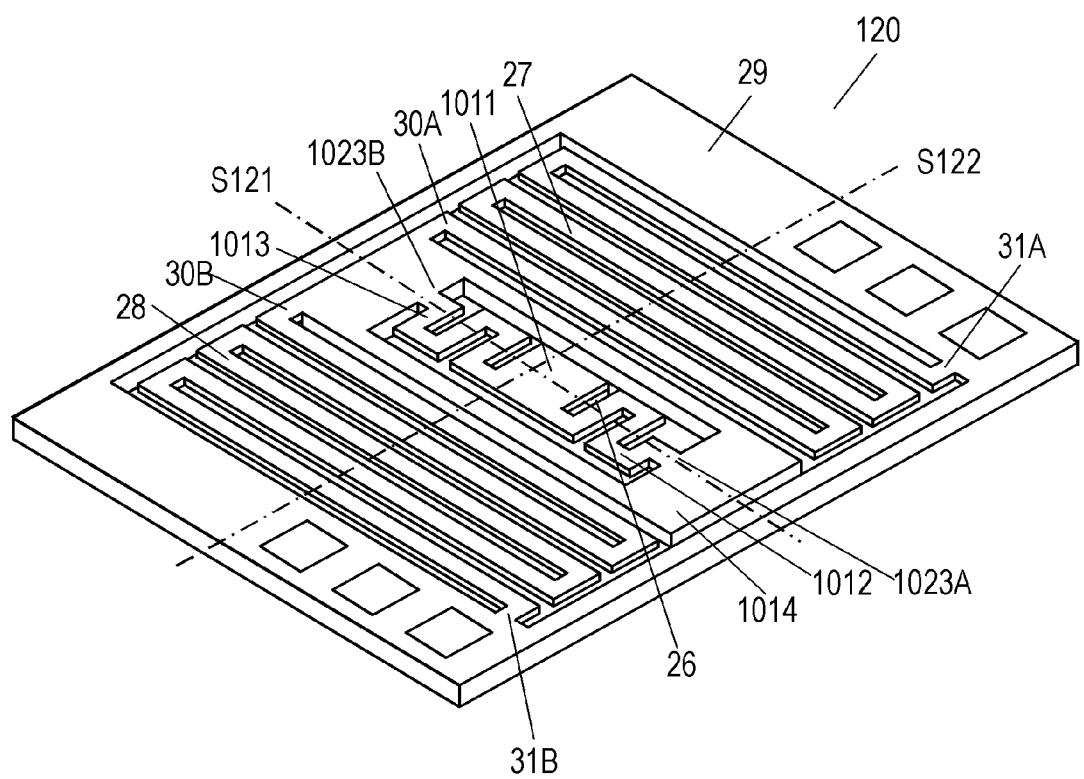
FIG. 12 is a perspective view of an optical reflection element according to a fourth exemplary embodiment of the present invention.
Figure 13:
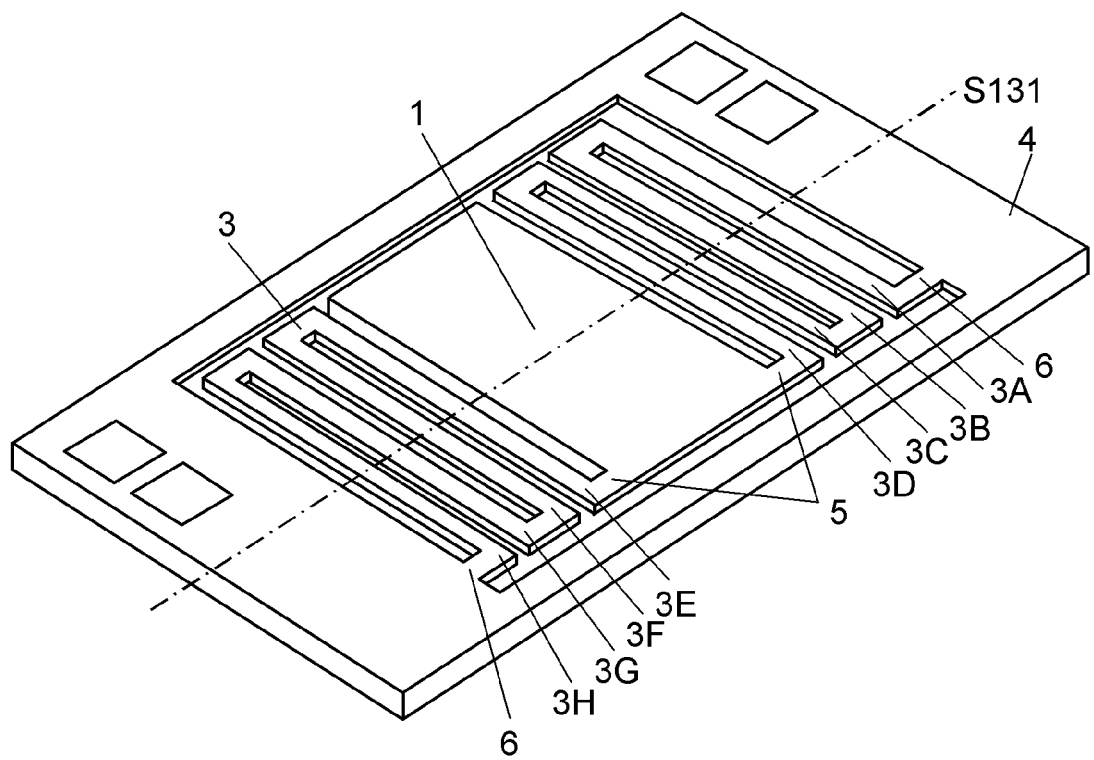
FIG. 13 is a perspective view of a conventional optical reflection element.

FIG. 12 is a perspective view of an optical reflection element according to a fourth exemplary embodiment of the present invention. Descriptions of components having similar constitutions to those in Embodiments 2, 3 will be omitted, and differences will be described in detail.

Optical reflection element 120 in the present embodiment has a constitution in which mirror portion 1011, oscillators 1012, 1013, supporting body 1014 and weight 26 in FIG. 10, which have been described in the second exemplary embodiment, are applied in place of mirror portion 11, oscillators 12, 13, and supporting body 14 in the third exemplary embodiment. That is, the joining positions of oscillators 1012, 1013 and supporting body 1014 are on mirror portion central axis S121, and in weight 26, as shown in FIG. 8, the pair of frame widths 26A, 26B of the weight parallel to mirror portion central axis S122 are asymmetric. The number of oscillating plates in oscillators 1012, 1013 is different from that in FIG. 9, which is not an essential difference.

With the above-described constitution, mirror portion 1011 can be driven highly efficiently as in the second exemplary embodiment. Moreover, optical reflection element 120 can be biaxially driven like in the third exemplary embodiment.

In optical reflection element 120, when mirror portion 911, oscillators 912, 913, and supporting body 914 shown in FIG. 9 are applied in place of mirror portion 1011, oscillators 1012, 1013, and supporting body 1014, mirror portion 911 can be driven more highly efficiently. While in FIG. 12, each of oscillators 27, 28 has a similar shape to that in FIG. 11, a length of the oscillating plates of oscillators 27, 28 may be changed to adjust positions of the turn portions as in the third exemplary embodiment.

INDUSTRIAL APPLICABILITY

The optical reflection element of the present invention can increase the amplitude angle of the mirror portion as compared with the conventional one, thereby enabling a high-accuracy image to be projected. This optical reflection element can be utilized for an image projection apparatus of a head-up display, a head mounted display or the like.

REFERENCE MARKS IN THE DRAWING

| | |
|---|---|
| 10, 110, 120 | optical reflection element |
| 11, 511, 611, 911, 1011 | mirror portion |
| 11R, 911R | reflection surface |
| 12, 512, 612, 912, 1012 | oscillator (first oscillator) |
| 12A, 12B, 12C, 13A, 13B, 13C | oscillating plate |
| 13, 513, 613, 913, 1013 | oscillator (second oscillator) |
| 14, 514, 914, 1014 | supporting body |
| 15 | drive element |
| 15A, 15B | drive element width |
| 16 | monitor element |
| 17 | base layer |
| 18 | lower electrode layer |
| 19 | piezoelectric body layer |
| 20 | drive electrode |
| 21 | monitor electrode |
| 22A, 22B, 23A, 23B, 523A, 523B, 1023A, 1023B | joining position |
| 24A, 24B, 25A, 25B, 624A, 624B, 625A, 625B | turn portion |
| 26 | weight |
| 26A, 26B, 26C | frame width |
| 26D | thickness |
| 27 | oscillator (third oscillator) |
| 27A, 27B, 27C, 27D, 27E, 28A, 28B, 28C, 28D, 28E | oscillating plate |
| 28 | oscillator (fourth oscillator) |
| 29 | supporting body (second supporting body) |
| 30A, 30B, 31A, 31B | joining position |
| 41A, 41B, 42A, 42B | terminal |
| 43 | insulating film |
| 111, 9111 | first side |
| 112, 9112 | second side |
| 113 | third side |
| 114 | fourth side |
| 115 | metal thin film |

The invention claimed is:

1. An optical reflection element comprising:
a supporting body;
a first oscillator having a first end joined to a supporting body;
a second oscillator having a first end joined to the supporting body; and
a mirror portion having a reflection surface:
wherein:
the mirror portion is joined to a second end of the first oscillator and is joined to a second end of the second oscillator:
the mirror portion has a mirror portion central axis passing through a center of the mirror portion along a direction where the first and second oscillators, and the mirror portion are arranged side-by-side;
each of the first and second oscillators has a drive portion that oscillates the minor portion:
a first joining position of the mirror portion and the first oscillator is located on a side opposite to a side where a second joining position of the supporting body and the first oscillator is located with respect to the mirror portion central axis; and
a third joining position of the mirror portion and the second oscillator is located on a side opposite to a side where a fourth joining position of the supporting body and the second oscillator is located with respect to the mirror portion central axis.

2. The optical reflection element according to claim 1, wherein the mirror portion has a frame-shaped weight provided on a back side of the reflection surface, and a frame width between an inside portion and an outside portion of the frame-shaped weight on the first side is different from that on the second side.

3. The optical reflection element according to claim 1, wherein the optical reflection element is adapted to be biaxially driven.

4. The optical reflection element according to claim 3, further comprising:
   a third oscillator disposed to have an oscillation axis which is perpendicular to an oscillation axis of each of the first oscillator and the second oscillator; and
   a fourth oscillator disposed to have an oscillation axis which is perpendicular to an oscillation axis of each of the first oscillator and the second oscillator.

5. The optical reflection element according to claim 4, wherein the oscillation axis of the first and second oscillators and the oscillation axis of the third and fourth oscillators cross in a center of the mirror portion.

6. The optical reflection element according to claim 5, wherein each of the third and fourth oscillators has a drive portion operable to oscillate the mirror portion, and has a meander shape in which a plurality of oscillating plates are joined so as to turn back at plural turn portions, and the turn portions are perpendicular to the mirror portion central axis.

7. The optical reflection element according to claim 1, wherein
   the mirror portion central axis is substantially same as a oscillation axis of the mirror portion.

8. The optical reflection element according to claim 1, wherein the supporting body has a frame-shape.

9. The optical reflection element according to claim 1, wherein the mirror portion has a rectangular-shape.

10. The optical reflection element according to claim 1, the mirror portion comprising;
   a first side;
   a second side parallel to the first side;
   a third side perpendicular to the first side; and
   a fourth side parallel to the third side;
   wherein the reflection surface is surrounded by the first side, the second side, the third side, and the fourth side.

11. The optical reflection element according to claim 10, wherein the first joining position of the mirror portion and the first oscillator is located on an end portion between the first side and the third side, and the third joining position of the mirror portion and the second oscillator is located on an end portion between the first side and the fourth side.

12. The optical reflection element according to claim 11, wherein the first and second oscillators have a meander shape in which three or more oscillating plates are joined so as to turn back at two or more turn portions.

13. The optical reflection element according to claim 12, wherein at least one condition selected from a following group of conditions is satisfied:
   at least a part of at least one of the turn portions of the first and second oscillators is located outside a first end portion axis that is parallel to the mirror portion central axis, and passes the first side of the mirror portion;
   a whole of at least one of the turn portions of the first and second oscillators is located inside the first end portion axis;
   at least a part of at least one of the turn portions of the first and second oscillators is located outside a second end portion axis that is parallel to the mirror portion central axis, and passes the second side of the mirror portion; and
   a whole of at least one of the turn portions of the first and second oscillators is located inside the second end portion axis.

14. An optical reflection element comprising:
   a supporting body;
   a first oscillator having a first end joined to the supporting body and having turn portions;
   a second oscillator having a first end joined to the supporting body and having turn portions; and
   a mirror portion having a reflection surface;
   wherein:
   the mirror portion is joined to a second end of the first oscillator, and is joined to a second end of the second oscillator;
   wherein the mirror portion has a mirror portion central axis passing through a center of the mirror portion along a direction where the first and second oscillators, and the mirror portion are arranged side-by-side;
   each of the first and second oscillators has a drive portion that oscillates the mirror portion;
   outer circumferences of the turn portions of the first and second oscillators are located outside a first end portion axis that is parallel to the mirror portion central axis, and passes a farthest portion from the mirror portion central axis in the mirror portion; and
   outer circumferences of the turn portions of the first and second oscillators are located outside a second end portion axis that is parallel to the mirror portion central axis, and passes a farthest portion from the mirror portion central axis in the mirror portion.

15. The optical reflection element according to claim 14, wherein
   the mirror portion central axis is substantially same as a oscillation axis of the mirror portion.

16. The optical reflection element according to claim 14, wherein the mirror portion has a frame-shaped weight provided on a back side of the reflection surface, and a frame width between an inside portion and an outside portion of the frame-shaped weight on the first side is different from that on the second side.

17. The optical reflection element according to claim 14, wherein the optical reflection element is adapted to be biaxially driven.

18. The optical reflection element according to claim 17, further comprising:
   a third oscillator disposed to have an oscillation axis which is perpendicular to an oscillation axis of each of the first oscillator and the second oscillator; and
   a fourth oscillator disposed to have an oscillation axis which is perpendicular to an oscillation axis of each of the first oscillator and the second oscillator.

19. The optical reflection element according to claim 18, wherein the oscillation axis of the first and second oscillators and the oscillation axis of the third and fourth oscillators cross in a center of the mirror portion.

20. The optical reflection element according to claim 19, wherein each of the third and fourth oscillators has a drive portion operable to oscillate the mirror portion, and has a meander shape in which a plurality of oscillating plates are joined so as to turn back at plural turn portions, and the turn portions are perpendicular to the mirror portion central axis.

21. The optical reflection element according to claim 14, the mirror portion comprising;
   a first side;
   a second side parallel to the first side;
   a third side perpendicular to the first side; and
   a fourth side parallel to the third side.

22. The optical reflection element according to claim 14, the first and second oscillators has a meander shape in which three or more oscillating plates are joined so as to turn back at two or more of the turn portions, and the turn portions are parallel to the mirror portion central axis.

23. The optical reflection element according to claim 14, wherein the supporting body has a frame-shape.

24. The optical reflection element according to claim 14, wherein the mirror portion has a rectangular-shape.

25. The optical reflection element according to claim 14, the first joining position of the mirror portion and the first oscillator is located on an end portion between the first side and the third side, the third joining position of the mirror portion and the second oscillator is located on an end portion between the first side and the fourth side.

26. An optical reflection element comprising:
a supporting body;
a first oscillator having a first end joined to a supporting body;
a second oscillator having a first end joined to the supporting body; and
a mirror portion having a reflection surface:
wherein:
the mirror portion is joined to a second end of the first oscillator and is joined to a second end of the second oscillator:
the mirror portion has a oscillation axis along a direction where the first and second oscillators, and the mirror portion are arranged side-by-side;
each of the first and second oscillators has a drive portion that oscillates the minor portion:
a first joining position of the mirror portion and the first oscillator is located on a side opposite to a side where a second joining position of the supporting body and the first oscillator is located with respect to the oscillation axis; and
a third joining position of the mirror portion and the second oscillator is located on a side opposite to a side where a fourth joining position of the supporting body and the second oscillator is located with respect to the oscillation axis.

27. An optical reflection element comprising:
a supporting body;
a first oscillator having a first end joined to the supporting body and having turn portions;
a second oscillator having a first end joined to the supporting body and having turn portions; and
a mirror portion having a reflection surface;
wherein:
the mirror portion is joined to a second end of the first oscillator, and is joined to a second end of the second oscillator;
wherein the mirror portion has a oscillation axis along a direction where the first and second oscillators, and the mirror portion are arranged side-by-side;
each of the first and second oscillators has a drive portion that oscillates the mirror portion;
outer circumferences of the turn portions of the first and second oscillators are located outside a first end portion axis that is parallel to the oscillation axis, and passes a farthest portion from the oscillation axis in the mirror portion; and
outer circumferences of the turn portions of the first and second oscillators are located outside a second end portion axis that is parallel to the oscillation axis, and passes a farthest portion from the oscillation axis in the mirror portion.

* * * * *